United States Patent [19]
DeJager et al.

[11] Patent Number: 5,258,777
[45] Date of Patent: Nov. 2, 1993

[54] THERMAL PRINTER SYSTEM WITH A HIGH APERTURE MICRO RELAY LENS SYSTEM

[75] Inventors: Donald DeJager, Rochester; Seung-ho Baek, Pittsford, both of N.Y.

[73] Assignee: Eastman Kodak Company, Rochester, N.Y.

[21] Appl. No.: 749,394

[22] Filed: Aug. 23, 1991

[51] Int. Cl.⁵ .................... B41J 2/435; G02B 13/24
[52] U.S. Cl. .................... 346/76 L; 346/108
[58] Field of Search .............. 359/757, 679; 346/76 L, 346/107 R, 108

[56] References Cited

U.S. PATENT DOCUMENTS

| | | | |
|---|---|---|---|
| 4,080,048 | 3/1978 | Kimura | 350/214 |
| 4,130,350 | 12/1978 | Koizumi | 350/216 |
| 4,206,974 | 6/1980 | Maeda | 350/215 |
| 4,235,520 | 11/1980 | Kimura | 359/757 |
| 4,251,131 | 2/1981 | Tojo | 350/414 |
| 4,364,644 | 12/1982 | Ikemori | 350/464 |
| 4,368,957 | 1/1983 | Chirra | 350/469 |
| 4,505,553 | 3/1985 | Asoma | 350/414 |
| 4,514,049 | 4/1985 | Hirano | 359/679 |
| 4,521,086 | 6/1985 | Kurita | 350/464 |
| 4,537,472 | 8/1985 | Asoma | 350/414 |
| 4,563,060 | 1/1986 | Yamagishi | 350/414 |
| 4,591,243 | 5/1986 | Yamagishi | 350/414 |
| 4,753,522 | 6/1988 | Nishina et al. | 350/470 |
| 4,955,701 | 9/1990 | Kataoka et al. | 350/481 |
| 4,999,648 | 3/1991 | Debesis | 346/107 R |
| 5,039,212 | 8/1991 | Kanoshima | 359/679 |
| 5,053,791 | 10/1991 | Baek et al. | 346/76 L X |

FOREIGN PATENT DOCUMENTS 0276865  8/1988  European Pat. Off. ............ 359/757

Primary Examiner—Benjamin R. Fuller
Assistant Examiner—Alrick Bobb
Attorney, Agent, or Firm—Svetlana Z. Short

[57] ABSTRACT

A thermal printer system using a multiple line scanning printhead with a micro relay lens system having high numerical apertures on both object and image sides.

17 Claims, 2 Drawing Sheets

THERMAL PRINTER SYSTEM WITH A HIGH APERTURE MICRO RELAY LENS SYSTEM

BACKGROUND OF THE INVENTION

Related Applications

The present application is related to the following commonly assigned co-pending applications: U.S. Ser. No. 670,088, U.S. Pat. No. 5,146,242 entitled WRITING BEAM ANGULAR ALIGNMENT DEVICE; U.S. Ser. No. 670,089, U.S. Pat. No. 5,146,241 entitled AUTOMATIC CUT-OUT FOR AUTO-FOCUS DEVICE; U.S. Ser. No. 670,092, U.S. Pat. No. 5,212,500 entitled WRITING BEAM FOCUSING UTILIZING LIGHT OF A DIFFERENT WAVELENGTH; U.S. Ser. No. 670,095, U.S. Pat. No. 5,196,886 entitled FOCUS FIBER MOUNT; and U.S. Ser. No. 670,129, U.S. Pat. No. 5,138,497 entitled HIGH SPEED FOCUSING LENS ASSEMBLY, all filed on Mar. 15, 1991; and U.S. Ser. No. 749,228, entitled LASER THERMAL PRINTER METHOD AND APPARATUS, in the names of Raymond J. Harshbarger, William G. Fahey, Ronald R. Firth, Seung-ho Baek, and Charles D. DeBoer; U.S. Ser. No. 749,229, entitled LASER THERMAL PRINTER USING ROLL MATERIAL SUPPLY, in the names of Frederick B. Fox, Michael H. Parsons and James L. Mohnkern; U.S. Ser. No. 749,378, entitled SELECTIVELY WOUND MATERIAL FOR A LASER THERMAL PRINTER, in the name of Michael H. Parsons; U.S. Ser. No. 749,223, entitled MATERIAL SUPPLY CAROUSEL, in the names of James L. Mohnkern, Michael H. Parsons, and Rene L. Gobeyn; U.S. Ser. No. 749,050, entitled MATERIAL TRANSPORT UTILIZING A MOVABLE EDGE GUIDE, in the name of Michael H. Parsons; U.S. Ser. No. 749,372, entitled LASER THERMAL PRINTER WITH A VERTICAL MATERIAL TRANSPORT, in the name of Michael H. Parsons; U.S. Ser. No. 749,224, entitled MATERIAL TRANSPORT THAT SELECTIVELY CONTACTS DIFFERENT MATERIALS, in the names of Michael H. Parsons and William J. Simmons; U.S. Ser. No. 749,399, entitled MULTI-CHAMBERED IMAGING DRUM, in the name of Roger S. Kerr: U.S. Ser. No. 749,232, entitled METHOD AND APPARATUS FOR SELECTIVELY SORTING IMAGE-BEARING SHEETS FROM SCRAP SHEETS, in the names of Bradley C. DeCook, Roger S. Kerr and Richard L. O'Toole; U.S. Ser. No. 749,391, entitled VACUUM IMAGING DRUM WITH A MATERIAL RECEIVING RECESS IN THE PERIPHERY THEREOF, in the name of Roger S. Kerr; U.S. Ser. No. 749,231, entitled METHOD OF REMOVING AIR FROM BETWEEN SUPERPOSED SHEETS, in the names of Bradley C. DeCook, Roger S. Kerr and Richard L. O'Toole; U.S. Ser. No. 749,389, entitled VACUUM IMAGING DRUM WITH AN AXIAL FLAT IN THE PERIPHERY THEREOF, in the name of Roger S. Kerr; U.S. Ser. No. 749,230, entitled METHOD AND APPARATUS FOR LOADING AND UNLOADING SUPERPOSED SHEETS ON A VACUUM DRUM, in the names of Roger S. Kerr and James K. Lucey; U.S. Ser. No. 749,227, entitled LASER THERMAL PRINTER WITH POSITIVE AIR FLOW, in the names of Roger S. Kerr and Douglass L. Blanding; U.S. Ser. No. 749,226, entitled AUTOFOCUS DETECTOR MASK, in the name of Michael S. Ferschl; U.S. Ser. No. 749,225, entitled INITIAL SET-UP PROCEDURE FOR AN AUTO-FOCUS LENS, in the name of Michael S. Ferschl; U.S. Ser. No. 749,222, entitled FOCUSING LASER DIODE MOUNT ON A WRITE HEAD, in the names of Michael S. Ferschl and Erich Zielinski; U.S. Ser. No. 749,386, entitled OPTICAL FIBER MOUNT AND SUPPORT, in the names of Roger S. Kerr and Stanley J. Thomas; U.S. Ser. No. 749,387, entitled REGISTRATION INDICIA ON A DRUM PERIPHERY, in the names of Cheryl J. Kuberka, David F. Dalfonso and Ensley E. Townsend; U.S. Ser. No. 749,382, entitled PRECISION LEAD SCREW DRIVE ASSEMBLY, in the name of Erich Zielinski; U.S. Ser. No. 749,390, entitled OPTICAL FIBER TAKE-UP ASSEMBLY, in the name of Erich Zielinski; U.S. Ser. No. 749,383, entitled WRITING TRANSLATOR MOUNT, in the name of Erich Zielinski; and U.S. Ser. No. 749,396, entitled HIGH APERTURE FINITE CONJUGATE LENS SYSTEM SUITABLE FOR USE AS A MICRO RELAY LENS, in the name of Donald DeJager, all filed Aug. 23, 1991.

Technical Field

This invention relates generally to thermal printers and more particularly to a thermal printer with micro relay lens system having high numerical apertures on both object and image sides.

Background Art

In the graphic arts industry, high dot density, high quality digital scanning printers are used for color proofing image generation, negative making or direct digital plate making. Typical required dot densities range from 1,000 dots per inch up to 3,000 dots per inch. The image sizes are comparatively large, from A4(8"×10") to A2(18"×24"). Printing any images of A2 size at 2,400 dots per inch (DPI) requires the system to handle 200 Mbytes of data in a few minutes. The size of the image and the large amount of image data employed makes the laser scanning system expensive and complicated. Any laser printing system using one laser beam requires expensive high speed electronics and precision optical components such as high performance lenses, a high speed polygon mirror or hologon deflector and complicated control electronics.

Our invention comprises a new simple system using a multiple line scanning printhead with a unique relay lens system. However, the lens system has to be a high quality finite conjugate system with high numerical apertures on both image and object sides. No such system was found to exist.

SUMMARY OF THE INVENTION

The object of this invention is to provide a thermal imaging apparatus using a multiple line scanning printhead with a very fast relaying lens system.

Accordingly, our invention comprises a thermal imaging apparatus comprising an imaging drum member mounted for rotation about its axis and arranged to receive a receiver member and a donor member superposed on the receiver member, means for generating a plurality of modulated coherent light beams, means for projecting the light beams onto the donor member mounted on the drum member to transfer an image onto the receiver member by transfer of a dye from the donor member, wherein the light projection means includes a finite conjugate lens system having high numerical apertures on both object and image sides and includes an aperture stop located approximately at the center of the high aperture lens system and a plurality of lens elements centered on an optical axis and arranged into two lens groups of positive power to provide the high numerical apertures on both object and image sides of the lens system.

According to a preferred embodiment of the invention, the thermal printer finite conjugate lens system includes two lens groups which are located on each side of the aperture stop and each lens group comprises an outer-most lens element and an inner-most lens element. The inner lens elements are located in close proximity to the aperture stop and each of the inner-most lens elements have a convex surface facing towards the aperture stop.

BEST MODE FOR CARRYING OUT THE INVENTION

Figure 2:
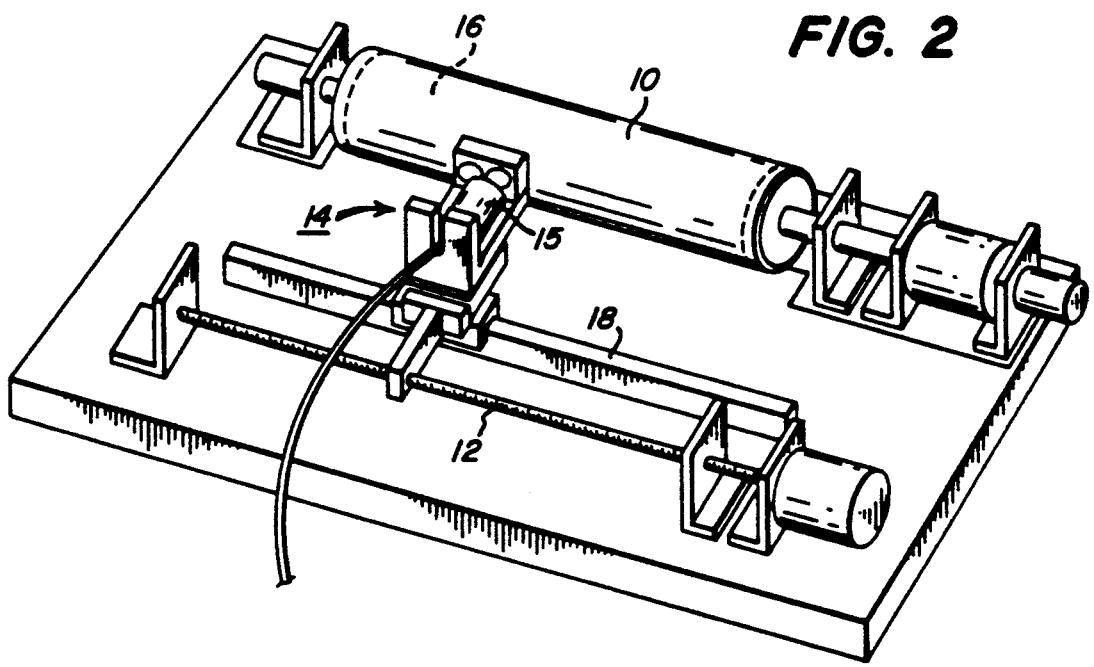
FIG. 2 is a schematic of a laser diode thermal printing system of the first illustrative embodiment.
Figure 3:
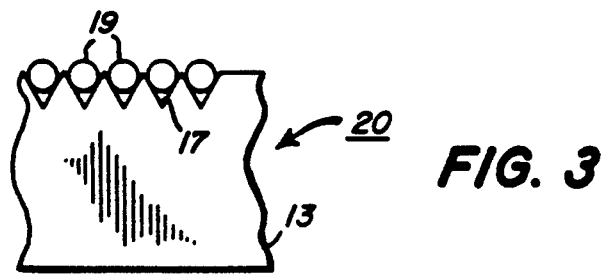
FIG. 3 is a schematic of a multi-fiber array printing head.

The preferred embodiment of the printer system shown in FIGS. 2 and 3 is composed of a drum 10, a lead screw 12 and a printhead 14. The photosensitive or thermal sensitive media 16 is wrapped around the drum 10 and the multiple laser beams are focused on the media 16. The printhead 14 is carried on a rail 18 and is driven by the lead screw 12 in synchronization with the drum rotation, so that the multiple image lines are scanned either helically or stepping-stair fashion to cover the whole imaging area. The optical system of the printer is composed of a silicon V-grooved fiber array 20, an imaging lens 15 and laser diodes (not shown). The fiber array 20 and the imaging lens 15 are mounted on a printhead mount module 14 with other associated components. The printhead module 14 is detached easily for any service as necessary.

It is well known technology that a silicon wafer 13 can be etched to have V-grooves 17 or U-grooves using chemical etchants. It is also well known to fabricate a fiber array using the silicon V-grooves 17 and multiple optical fibers 19. Two patents have been issued on the fiber array printhead as U.S. Pat. No. 4,389,655 and U.S. Pat. No. 4,911,526. The printer system can use either method, simple straight- V-grooves as indicated in U.S. Pat. No. 4,389,655 or tapered fibers in the fanned-out V-grooves described in U.S. Pat. No. 4,911,526. The silicon wafer is prepared with many photolithographic patterns to form up to 6 printheads. The wafer is coated with 100 angstroms of silicon oxide and another 100 angstroms of silicon nitride to prevent undercutting of the masked area. When the depth of V-grooves are more than a few 10's of microns, the silicon wafer has to be etched longer periods, which tends to etch under a narrow stripe of masked area. This undercutting of the masked area makes it difficult to have deep V-grooves with a very narrow gap between. The silicon nitride helps to protect the narrow masked area due to the very dense protective mask. We added 100 angstrom of silicon nitride on the top of the silicon oxide layer which is the typical practice in the industry. The etchant is a solution of 20% KOH, 64% water and 16% of Isopropanol by weight at 50 degree C. The isopropanol also helps to prevent the undercutting problem of the narrow masked area.

A single layer, multi-fiber array printhead on a silicon wafer provided with V-grooves is used with a lens to achieve small written dot size on the order of 10 $\mu$m diameter or less than 10 $\mu$m. The lens can reduce the diameter of the image of the fibers to $\frac{1}{2}$ to $\frac{1}{3}$ of the original size. If small diameter, multimode fibers, such as 50 $\mu$m core, or a single mode fiber with 10 $\mu$m core are used, very small written dot sizes required for high dot density-high quality imaging printing may be obtained. The specific lenses will be discussed in the following section. According to one aspect of the present invention, several lines are written helically or stepping-stair fashion to cover the whole width of the image. If an overlap is required to cover the raster lines, the printhead is tilted to the proper angle to the drum axis.

To relate a large number of fibers to the imaging plane, very unusual lens systems have been designed. The requirements for the lens system are;

a) It must have a large covering area on the focal planes. Typical required focal area is 2 mm on the object focal plane and 1 mm or 0.7 mm on the imaging focal plane.

b) They have high numerical apertures, on both object and image sides, such as are associated with microscope objectives. The numerical aperture on the object side of the lens should be large enough to capture a large fraction of the energy leaving the fiber ends. Multimode fibers typically have numerical apertures of 0.3 to 0.4, and single mode fibers will typically have numerical apertures of 0.1 to 0.2. The relay lenses described herein have object-side numerical apertures of 0.2 to 0.253, which is large enough to capture most of the energy emitted by the fibers.

The magnification of the lens is determined as;

$$\text{Magnification} = \frac{(N.A.)_{object}}{(N.A.)_{image}} \quad (1)$$

Five different lens systems were designed to be used with the printing system. Their system parameters are described below in the following five embodiments:

| Embodiment number | 1 | 2 | 3 | 4 | 5 |
|---|---|---|---|---|---|
| Number of Elements | 7 | 8 | 8 | 9* | 9* |
| Object Diagonal | 3.6 mm | 3.6 mm | 2.4 mm | 3.6 mm | 3.0 mm |
| Image Diagonal | 1.8 mm | 1.2 mm | 0.8 mm | 1.68 mm | 1.4 mm |
| Magnification | 0.5 | 0.3333 | 0.3333 | 0.46 | 0.46 |
| Object Numerical Aper. | 0.25 | 0.2 | 0.2 | 0.253 | 0.253 |
| Image Numerical Aper. | 0.50 | 0.6 | 0.6 | 0.55 | 0.55 |
| ANSI f-number of | 0.67 | 0.63 | 0.63 | 0.62 | 0.62 |

-continued

| Embodiment number | 1 | 2 | 3 | 4 | 5 |
|---|---|---|---|---|---|
| lens Total Track Length | 50.8 mm | 50.8 mm | 50.8 mm | 70.7 mm | 58.5 mm |

*not including the beamsplitter prism used for autofocusing.

Any optical component should be properly mounted without any loose movement. We discovered a novel printhead mount module which holds the printhead in a rotational printhead holder with an accurate focus adjuster and the relaying lens on the same mount. The module ensures that there is no loose movement between each of the components and it is easy to service. The printhead is held firmly in a holder which sits in a barrel type focusing adjuster moving along the optical axis. The focusing attachment is held firmly in a rotational stage which can be rotated very accurately by 0.1 degree graduations. A shutter is attached between the printhead and the lens, so that the writing beams are blocked as necessary. The relaying lens is held firmly on the mount. Whenever the lens has to be cleaned, the whole mount can be detached from the printing system and the lens can be cleaned or serviced easily.

Each end of the fibers of the printhead is terminated using standard connectors, such as ST or SM connectors. The laser diodes with fiber pig-tails are terminated using the same type of standard connectors and the two ends from laser diodes and fibers of the printhead are connected easily. It is very easy to replace any laser diodes which are degraded or dead. The laser diodes can be mounted away from the thermally sensitive mechanical or optical components of the printer and can be cooled using an inexpensive fan or some other means.

Figure 1:
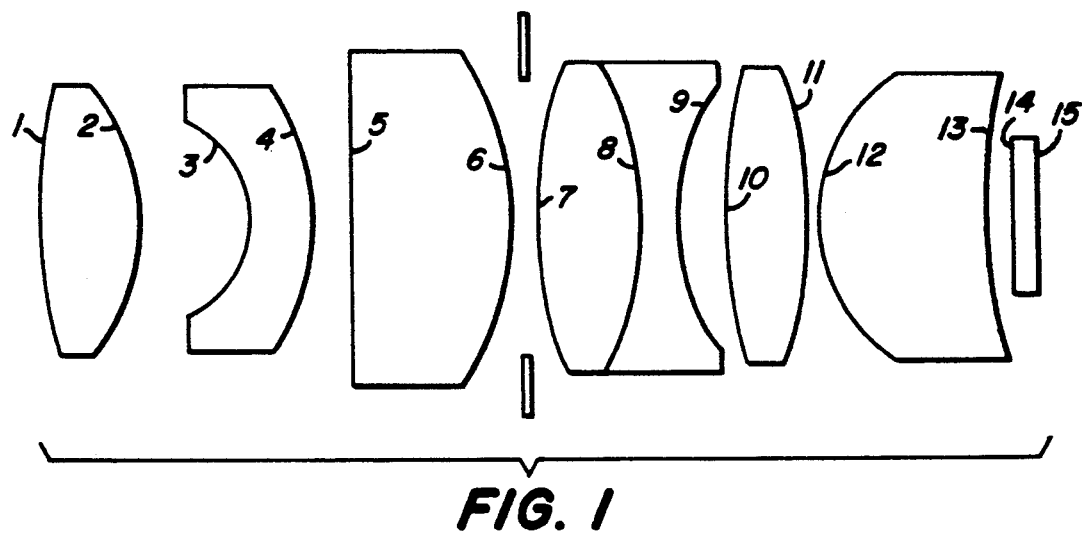
FIG. 1 is a profile drawing of an optical system used of the first illustrative embodiment of the present invention.

The lens system 100 is illustrated in FIG. 1. It was designed for use in a laser thermal printing system (FIG. 2) using a multi-fiber array printing head (FIG. 3) coupled to high power laser diodes. The printer system uses a drum for the line direction scan movement and a stepping motor or a linear translation stage for the page direction scan movement. A custom designed lens was necessary to meet the requirements for the numerical aperture and the field of view requirements. The numerical aperture of the beam on the object side of the lens system is 0.25, and the numerical aperture of the beam on the image side of the lens system is 0.5. The ANSI f-number of the lens system is 0.6667. The field angle is 3.08 degrees. The relative illumination due to cosine effects exceeds 1.0 at the edge of the field of view. The distance from the object to image is 50.8 mm (2 inches). The lens system 100 is used in the rear infrared IR (630 to 810 nm) to relay an object having a diameter of 2.4 mm to an image of diameter 1.2 mm giving a magnification of ½. The lens system is used to form an image of a source consisting of a linear array of fibers, each transmitting energy from remotely located infrared laser diodes. The combination of very high numerical aperture and sharp imagery over an extended field of view dictated the need for a new lens of a very unusual construction.

The lens system 100 comprises a plurality of lens elements and an aperture stop located approximately at the center of the lens system. Following from object to image, the numerical data for the optical system is as follows:

TABLE 1

| SURFACE | CLEAR APER. | RADIUS | THICKNESS | GLASS |
|---|---|---|---|---|
| S1 | 8.41 | 38.6019 | 3.670 | 517642 |
| S2 | 8.82 | −7.29740 | 4.100 | |
| S3 | 6.83 | −4.31940 | 2.360 | 785258 |
| S4 | 8.94 | −8.54580 | 1.400 | |
| S5 | 10.12 | PLANO | 6.290 | 651559 |
| S6 | 11.36 | −10.7207 | 0.500 | |
| | 10.55 | DIAPHRAGM | 0.500 | |
| S7 | 10.44 | 17.0410 | 3.800 | 651559 |
| S8 | 9.87 | −12.0819 | 1.500 | 785258 |
| S9 | 9.09 | 9.22950 | 1.810 | |
| S10 | 9.57 | 42.9968 | 3.020 | 651559 |
| S11 | 10.01 | −14.6843 | 0.500 | |
| S12 | 9.74 | 6.77130 | 6.400 | 720504 |
| S13 | 5.98 | 15.7111 | 1.000 | |
| S14 | 5.14 | PLANO | 1.000 | 517642 |
| S15 | 4.44 | PLANO | | |
| | | LENS LENGTH | 37.850 | |

Figure 4:
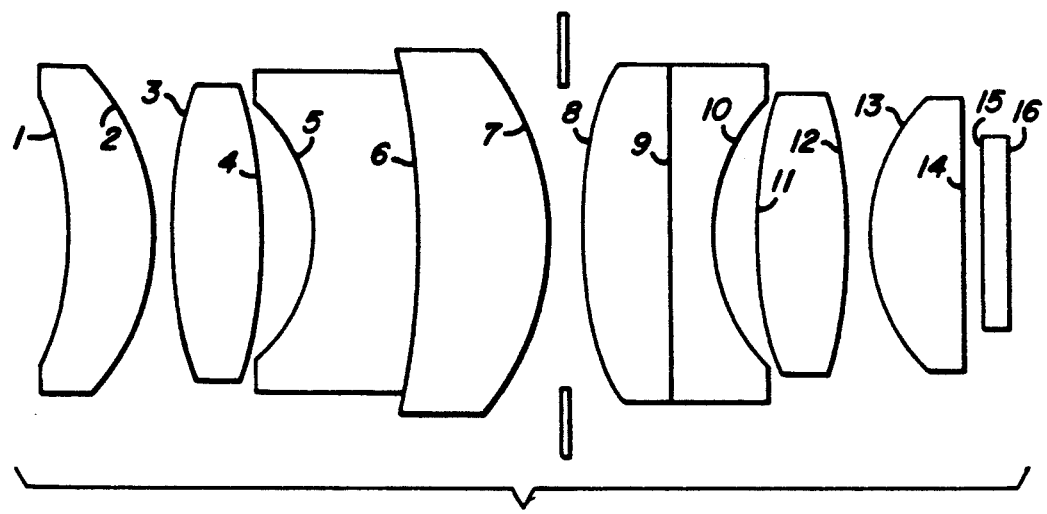
FIG. 4 is a profile drawing of a second optical system.

The lens system 200 is illustrated in FIG. 4, and is used to relay an object of a diameter 3.6 mm to an image of diameter 1.2 mm giving a magnification of ⅓. The numerical aperture of the optical system at the object side is 0.2. The numerical aperture of the optical system at the image side is 0.6. The ANSI f-number is 0.625. This lens system is designed for possible use as a ⅓ X relay lens in a laser thermal printer described in FIGS. 2 and 3. The lens system 200 comprises a plurality of lens elements arranged into two lens groups on either side of the aperture stop. The aperture stop is again located approximately at the center of the lens system. The numerical data for the optical system of 200 is as follows:

TABLE 2

| SURFACE | CLEAR APER. | RADIUS | THICKNESS | GLASS |
|---|---|---|---|---|
| S1 | 8.35 | −10.7207 | 2.970 | 651559 |
| S2 | 9.42 | −7.32390 | 0.580 | |
| S3 | 8.87 | 18.1807 | 3.070 | 651559 |
| S4 | 8.22 | −18.1807 | 1.650 | |
| S5 | 7.65 | −5.62700 | 3.070 | 785258 |
| S6 | 9.41 | −96.0144 | 5.000 | 651559 |
| S7 | 10.75 | −8.52190 | 0.500 | |
| | 9.92 | DIAPHRAGM | 0.500 | |
| S8 | 9.76 | 11.9221 | 3.140 | 651559 |
| S9 | 8.92 | PLANO | 1.500 | 785258 |
| S10 | 7.88 | 6.67350 | 1.340 | |
| S11 | 8.13 | 18.1807 | 3.070 | 651559 |
| S12 | 8.33 | −18.1807 | 0.500 | |
| S13 | 7.97 | 5.91100 | 3.580 | 720504 |
| S14 | 6.40 | PLANO | 0.500 | |
| S15 | 5.61 | PLANO | 1.000 | 517642 |
| S16 | 4.72 | PLANO | | |
| | | LENS LENGTH | 31.970 | |

On the image side of the lens system, there is a 1 mm thick protective window, which can be easily cleaned. The focusing function is performed by moving an entire lens system.

Figure 5:
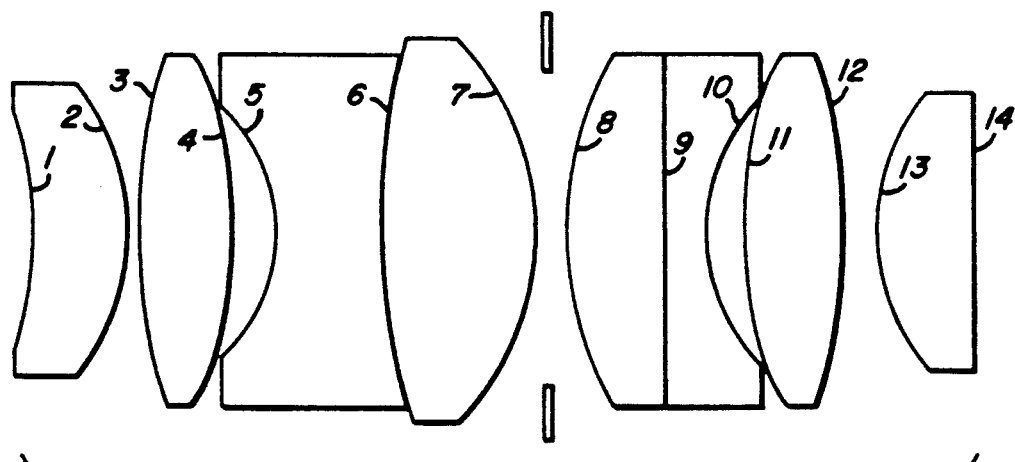
FIG. 5 is a profile drawing of a third optical system.

The lens system 300 is illustrated in FIG. 5. It is designed for the wavelength range of 750 to 850 nm with the principal wavelength of 800 nm. The focusing function is performed by the movement of the rear-most lens element L8. The track length (i.e. the distance from the object to the image), nominally 2 inches or 50.8 mm will thus change by ±0.1 mm. Unlike the above two lens systems, this lens system does not use a protective window at the rear. The object diameter is 2.4 mm, while the image diameter is 0.8 mm, thus the optical system 300 has a magnification of ⅓. The numerical aperture at the object side is 0.2 and the numerical aperture at the image side is 0.6. The lens system 300 has an unusual feature, its sixth lens component can be varied in position, with respect to the preceeding components, by as much as +/−0.1 mm, while the location of the image surface will stay nearly fixed with respect to the rear plano surface of sixth component.

The object for the lens system 300 consists of a linear array of 15 circular spots, each 0.1 mm in diameter, with center to center spacing of 0.15 mm. At ⅓ magnification, the images of the spots are 0.0333 mm in diameter. This is relative coarse image structure.

Because of the high numerical aperture of the beam at the image, the depth of focus according to the Rayleigh criterion is about +/−0.00111 mm, but because of the relatively coarse nature of the image structure, a more realistic tolerance for the depth of focus is about +/−0.01 mm, about 9 times larger than the Rayleigh depth. The numerical data for the lens system 300 is as follows:

TABLE 3

| SURFACE | CLEAR APER. | RADIUS | THICKNESS | GLASS |
|---|---|---|---|---|
| S1 | 7.31 | −11.7310 | 3.060 | 651559 |
| S2 | 8.35 | −7.21870 | 0.500 | |
| S3 | 8.06 | 24.8075 | 2.970 | 651559 |
| S4 | 7.61 | −15.0074 | 1.510 | |
| S5 | 7.19 | −5.20670 | 3.910 | 785258 |
| S6 | 9.77 | 42.2210 | 4.870 | 651559 |
| S7 | 11.03 | −8.23800 | 0.500 | |
| | 10.34 | DIAPHRAGM | 0.500 | |
| S8 | 10.14 | 10.9567 | 3.260 | 651559 |
| S9 | 9.21 | PLANO | 1.500 | 785258 |
| S10 | 7.97 | 6.38860 | 1.360 | |
| S11 | 8.23 | 15.0074 | 2.970 | 651559 |
| S12 | 8.33 | −24.8075 | 1.100 | |
| S13 | 7.94 | 6.19740 | 3.500 | 772497 |
| S14 | 6.40 | PLANO | | |
| | | LENS LENGTH | 31.510 | |

Figure 6:
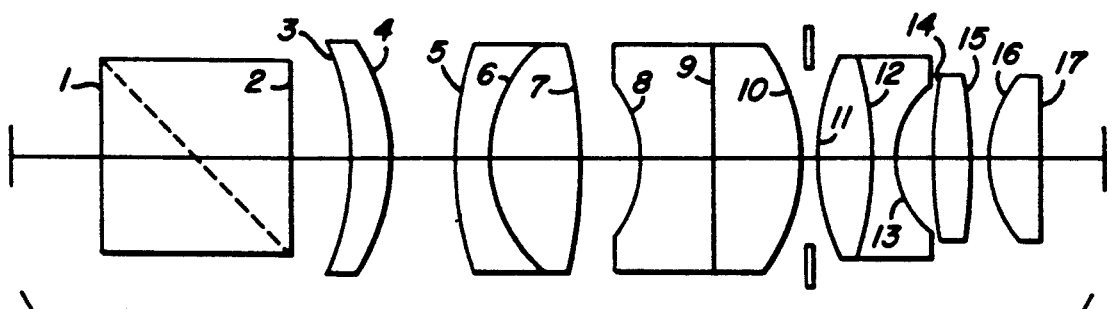
FIG. 6 is a profile drawing representing a fourth and fifth optical system.

The fourth and the fifth lens systems that may also be used in the printer apparatus are similar to each other and are illustrated in FIG. 6.

They are designed to have a track length of 70.7 m and 58.5 mm respectively. The object side numerical aperture is 0.253. The image side numerical aperture is 0.55. The ANSI f-number is 0.62 and magnification is 0.46 for both lens system designs.

Both lens systems are designed for 750-850 nm range and are given in Tables 4 and 5.

TABLE 4

| SURFACE | CLEAR APER. | RADIUS | THICKNESS | GLASS |
|---|---|---|---|---|
| S1 | 6.92 | PLANO | 12.000 | 785258 |
| S2 | 10.65 | PLANO | 4.000 | |
| S3 | 12.40 | −21.6194 | 3.020 | 772497 |
| S4 | 13.39 | −11.1939 | 3.860 | |
| S5 | 13.01 | 24.0092 | 2.000 | 785258 |
| S6 | 12.11 | 9.35980 | 5.500 | 772497 |
| S7 | 11.36 | −32.6195 | 4.430 | |
| S8 | 8.62 | −6.61220 | 4.400 | 785258 |
| S9 | 10.81 | PLANO | 5.910 | 772497 |
| S10 | 12.29 | −10.9567 | 0.320 | |
| | 11.43 | DIAPHRAGM | 0.300 | |
| S11 | 11.25 | 41.0008 | 3.370 | 772497 |
| S12 | 10.47 | −34.0226 | 2.000 | 785258 |
| S13 | 8.76 | 7.07690 | 2.220 | |
| S14 | 9.21 | 32.7992 | 2.170 | 772497 |
| S15 | 9.39 | −32.7992 | 1.100 | |
| S16 | 9.34 | 7.29740 | 3.500 | 772497 |
| S17 | 8.12 | PLANO | | |

TABLE 4-continued

| SURFACE | CLEAR APER. | RADIUS | THICKNESS | GLASS |
|---|---|---|---|---|
| | | LENS LENGTH | 60.100 | |

TABLE 5

| SURFACE | CLEAR APER. | RADIUS | THICKNESS | GLASS |
|---|---|---|---|---|
| S1 | 4.83 | PLANO | 8.000 | 517642 |
| S2 | 7.73 | PLANO | 4.000 | |
| S3 | 9.63 | −18.9706 | 3.360 | 772497 |
| S4 | 10.85 | −9.27810 | 1.240 | |
| S5 | 10.56 | 32.8590 | 2.000 | 785258 |
| S6 | 10.05 | 11.1065 | 4.790 | 772497 |
| S7 | 9.47 | −22.3953 | 4.380 | |
| S8 | 6.95 | −5.06210 | 3.000 | 785258 |
| S9 | 9.01 | 98.0453 | 5.060 | 772497 |
| S10 | 10.49 | −8.74010 | 0.550 | |
| | 9.80 | DIAPHRAGM | 0.420 | |
| S11 | 9.75 | 11.9576 | 3.690 | 772497 |
| S12 | 8.89 | −20.9492 | 2.000 | 785258 |
| S13 | 7.42 | 6.11100 | 1.870 | |
| S14 | 7.88 | 23.8064 | 2.680 | 772497 |
| S15 | 8.13 | −23.8064 | 1.100 | |
| S16 | 7.99 | 6.19740 | 3.500 | 772497 |
| S17 | 6.56 | PLANO | | |
| | | LENS LENGTH | 51.640 | |

We claim:

1. A thermal imaging apparatus comprising:
an imaging drum arranged to mount a receiver member and a donor member in superposed relationship thereon;
means for rotating the drum about an axis;
means for generating a plurality of modulated coherent light beams and;
light projection means for projecting said light beams onto said donor member to transfer an image onto said receiver member by transfer of a dye from said donor member;
wherein said light projection means includes a finite conjugate lens system having high numerical apertures of at least about 0.2 on both object and image sides and said lens system includes an aperture stop located approximately at a center of said lens system and a plurality of lens elements centered on an optical axis and arranged into two lens groups of positive power to provide said high numerical apertures on both object and image sides of said lens system.

2. The imaging apparatus of claim 1 and wherein said numerical aperture on the image side is 0.5 or larger.

3. A thermal imaging apparatus comprising;
an imaging drum arranged to mount a receiver member and a donor member in superposed relationship thereon;
means for rotating the drum about an axis;
means for generating a plurality of modulated coherent light beams and;
light projection means for projecting said light beams onto said donor member mounted on said drum member to transfer an image onto said receiver member by transfer of a dye from said donor member;
wherein said light projection means includes a finite conjugate lens system having high numerical apertures on both object and image sides, an aperture stop is located approximately at a center of said lens system and a plurality of lens elements are centered on an optical axis and arranged into two lens groups of positive power to provide said high numerical apertures on both object and image sides of said lens system, one of said lens groups being located on one side of said aperture stop and another of said lens groups being located on another side of said aperture stop, said lens groups each comprising an outer-most lens element and an inner-most lens element located in close proximity to said aperture stop, said inner-most lens element of each lens group having a convex surface facing towards said aperture stop.

4. The imaging apparatus of claim 3 and wherein said numerical apertures are at least 0.2.

5. The imaging apparatus of claim 4 and wherein said numerical aperture on the image side is 0.5 or larger.

6. An imaging apparatus comprising:
means for supporting an imaging member that is to receive an exposure;
means for generating a light beam; and
light projection means for projecting said light beam onto said member, wherein the light projection means includes a finite conjugate lens system having high numerical apertures on both object and image sides of at least about 0.2 and said lens system includes an aperture stop located approximately at the center of said lens system and a plurality of lens elements centered on an optical axis and arranged into two lens groups of positive power to provide said high numerical apertures on both object and image sides of said lens system.

7. An imaging apparatus comprising:
means for supporting an imaging member that is to receive an exposure;
means for generating a light beam;
means for projecting said light beam onto said member, wherein said light projection means includes a finite conjugate lens system having high numerical apertures on both object and image sides comprising an aperture stop located approximately at a center of said high aperture lens system and a plurality of lens elements centered on an optical axis and arranged into two lens groups of positive power to provide said high numerical apertures on both object and image sides of said lens system, one of said lens groups being located on one side of said aperture stop and another of said lens groups located on another side of said aperture stop, said lens groups each comprising an outer-most lens element and an inner-most lens element located in close proximity to said aperture stop, said inner-most lens element of each lens group having a convex surface facing towards said aperture stop.

8. The imaging apparatus of claim 7 and wherein said numerical apertures are at least 0.2.

9. The imaging apparatus of claim 8 and wherein said numerical aperture on the image side is at least 0.5.

10. The imaging apparatus of claim 7 and wherein said numerical apertures are about 0.2 or larger.

11. The imaging apparatus of claim 10 and wherein said numerical aperture on the image side is about 0.5 or larger.

12. A thermal imaging apparatus comprising:
an imaging drum arranged to mount a receiver member and a donor member in superposed relationship thereon;
means for rotating the drum about an axis;
means for generating a plurality of modulated coherent light beams;
light projection means for projecting said light beams onto said donor member to transfer an image onto said receiver member by transfer of a dye from said donor member; and
wherein said light projection means includes a fiber array, a laser diode, and a finite conjugate lens system having high numerical apertures of at least about 0.2 on both object and image sides and said lens system includes an aperture stop located approximately at the center of said lens system and a plurality of lens elements centered on an optical axis and arranged into two lens groups of positive power to provide said high numerical apertures on both object and image sides of said lens system.

13. The imaging apparatus of claim 12 and wherein said numerical aperture on the image side is 0.5 or larger.

14. A thermal imaging apparatus comprising:
an imaging drum arranged to mount a receiver member and a donor member in superposed relationship thereon;
means for rotating the drum about an axis;
means for generating a plurality of modulated coherent light beams;
light projection means for projecting said light beams onto said donor member mounted on said drum member to transfer an image onto said receiver member by transfer of a dye from said donor member; and
wherein said light projection means includes a fiber array, a laser diode and a finite conjugate lens system having high numerical apertures on both object and image sides, an aperture stop is located approximately at the center of said lens system and a plurality of lens elements are centered on an optical axis and arranged into two lens groups of positive power to provide said high numerical apertures on both object and image sides of said lens system, one of said lens groups being located on one side of said aperture stop and another of said lens groups being located on another side of said aperture stop, said lens groups each comprising an outer-most lens element and an inner-most lens element located in close proximity to said aperture stop, said inner-most lens element of each lens group having a convex surface facing towards said aperture stop.

15. An imaging apparatus comprising:
means for supporting an imaging member that is to receive an exposure;
means for generating a light beam;
means for projecting said light beam onto said member, wherein said light projection means includes a fiber array and a finite conjugate lens system having high numerical apertures on both object and image sides for imaging said fiber array, said lens system comprising an aperture stop located approximately at the center of said high aperture lens system and a plurality of lens elements centered on an optical axis and arranged into two lens groups of positive power to provide said high numerical apertures on both object and image sides of said lens system for relating said fiber array to the imaging plane, one of said lens groups being located on one side of said aperture stop and another of said lens groups located on another side of said aperture stop, said lens groups each comprising an outer-most lens element and an inner-most lens element located in close proximity to said aperture stop, said inner-most lens element of each lens group having a convex surface facing toward said aperture stop.

16. The imaging apparatus of claim 15 and wherein said numerical apertures are at least 0.2.

17. The imaging apparatus of claim 16 and wherein said numerical aperture on the image side is at least 0.5.

* * * * *